Feb. 19, 1963
C. R. STARR
3,078,110
SEALING DEVICE
Filed Oct. 13, 1958
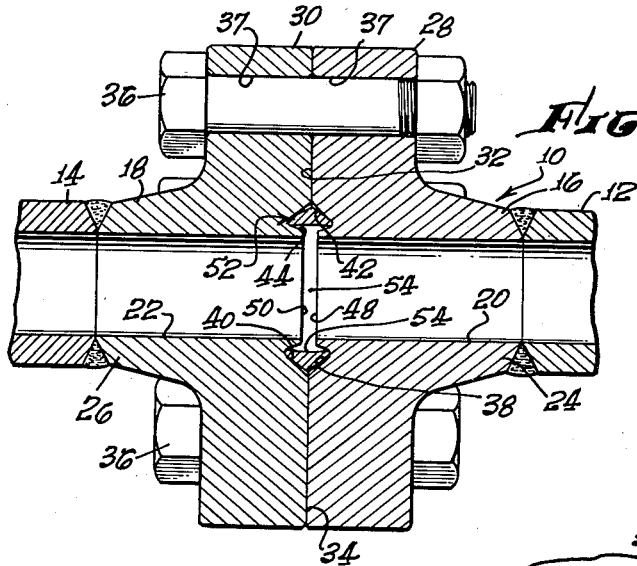
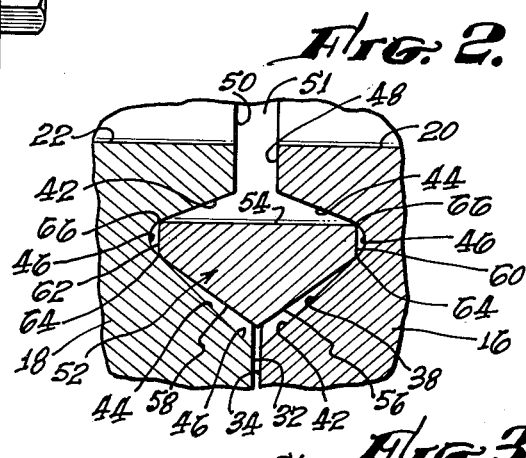
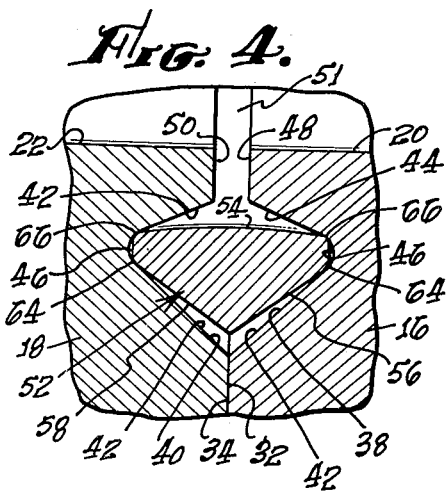
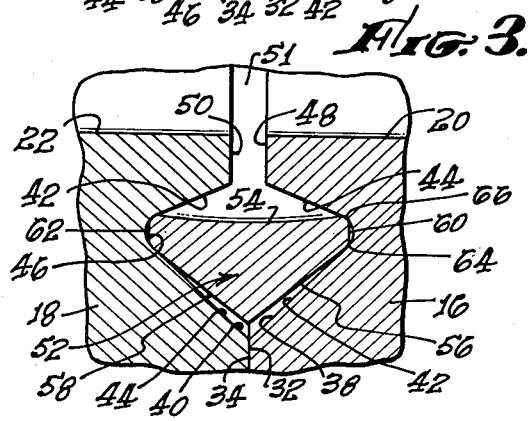
INVENTOR.
CLIFFORD R. STARR,
BY
ATTORNEYS.

United States Patent Office 3,078,110
Patented Feb. 19, 1963

3,078,110
SEALING DEVICE
Clifford R. Starr, Fullerton, Calif., assignor to Accessory Products Co., a division of Textron Inc., Whittier, Calif., a corporation of Rhode Island
Filed Oct. 13, 1958, Ser. No. 766,819
2 Claims. (Cl. 285—336)

My present invention relates to fluid type joints, and it relates more specifically to a novel sealing means having particular utility in high pressure fluid tight joints.

Although my present invention is illustrated and hereinafter described in connection with a joint between two sections of pipe or tubing for transferring liquid or gas under pressure, it is to be understood that my novel sealing means is similarly applicable to other types of joints between two elements. For example, my present sealing means may be used for providing a high pressure fluid seal between a conduit and a closure member.

Although conventional soft, flexible O-rings normally provide an adequate seal for pressures up to about two thousand p.s.i., it is usually preferable to employ metal sealing rings at higher pressures. Conventional metal sealing rings are pre-shaped to fit within the flange grooves of the joint, and must be tightly wedged into the flange grooves in order to provide an adequate seal. The stresses are so high in joints utilizing conventional metal sealing rings that these joints are unduly bulky and heavy. Also, the tolerances are quite close in connection with these conventional joints in order to provide an accurate seal.

In view of these and other problems in connection with conventional prior art seals for high pressure joints, it is an object of my present invention to provide a novel metal sealing ring and groove construction in which a malleable sealing ring is provided, this sealing ring having an annular sealing edge thereon formed at the juncture between two surfaces on the ring, this annular sealing edge being pressure molded into sealing engagement in a sealing groove when the two sections of the joint are tightened together.

Another object of my present invention is to provide a novel sealing device of the character described which includes a malleable metal sealing ring having a generally delta cross-sectional shape, with the opposed side edges of the ring each having a pair of slightly spaced annular corners, the side edges of the ring being adapted to fit into curved grooves in the joint with the annular corners being mashed or molded to the shapes of the grooves when the two sections of the joint are tightened together to complete the fluid tight seal.

Another object of my present invention is to provide a novel high pressure seal of the character described which permits a substantial reduction in the size and weight of the joint embodying the seal as compared with joints utilizing conventional prior art seals.

Other objects and advantages of my present invention will be apparent from the following description and claims, the novelty of my invention consisting in the features of construction, the combinations of parts, the novel relations of the members, the relative proportioning, disposition and operation thereof, and the novel method steps, all as is more completely described herein and as is more particularly pointed out in the appended claims.

In the accompanying drawings, forming a part of my present specification;

FIGURE 1 is a sectional view illustrating a sealed joint embodying the presently preferred embodiment of my invention.

FIGURE 2 is a greatly enlarged sectional view illustrating my presently preferred sealing ring and groove assembly before the two sections of the joint have been tightened together.

FIGURE 3 is a greatly enlarged sectional view similar to FIGURE 2 illustrating my sealing ring and groove assembly after the ring has been compressed in the grooves by tightening the two sections of the joint together.

FIGURE 4 is a sectional view similar to FIGURE 3 illustrating the alternative inward bowing of my ring as compared with the outward bowing illustrated in FIGURE 3.

Referring to my drawings, I have illustrated a sealed joint 10 for providing a high pressure fluid tight joint between a pair of pipe or tubing sections 12 and 14.

My joint 10 includes a pair of opposed annular body portions 16 and 18 having respective aligned, central fluid passages 20 and 22 therethrough.

The outer ends 24 and 26 of annular body portions 16 and 18 are operatively connected to the respective pipe or tubing sections 12 and 14 by any conventional means, such as by welding.

The adjoining ends of annular body portions 16 and 18 are provided with annular flanges 28 and 30 having respective mating flat annular surfaces 32 and 34 disposed at right angles to the axes of annular body portions 16 and 18.

The annular flanges 28 and 30 are drawn together and held with the annular surfaces 32 and 34 seated against each other by means of a plurality of bolts 36 disposed through a plurality of passages 37 uniformly spaced around the flanges 28 and 30.

I provide opposed annular grooves 38 and 40 in the respective flat annular surfaces 32 and 34, the grooves 38 and 40 being disposed closely adjacent to the passages 20 and 22. The grooves 38 and 40 are generally V-shaped, having converging outer and inner inclined groove surfaces 42 and 44, respectively, which are joined together at curved bottom portions 46 of the grooves 38 and 40.

In order to best accommodate my presently preferred delta shaped sealing ring, I prefer to provide the outer groove surfaces 44 with substantially greater inclines relative to the axes of the grooves than the inner groove surfaces 42. Although the amount of incline of these surfaces 42 and 44 is not in any way critical, I have found that angles of incline relative to the axes of the grooves of about 45° for the outer groove surfaces 42 and about 15° for the inner groove surfaces 44 operate satisfactorily.

A narrow lip 48 separates the annular groove 38 from passage 20, and a similar complementary lip 50 separates the annular groove 40 from passage 22. These lips 48 and 50 are somewhat separated to provide an annular opening 51 adapted to admit fluid under pressure from passages 20 and 22 as hereinafter described.

My sealing ring 52 is preferably composed of a relatively soft, malleable metal which can be caused to flow under substantial pressure. I have found aluminum to be satisfactory for this purpose, although it will be apparent that other metals can be used.

My presently preferred sealing ring 52 includes an inner cylindrical surface 54 and generally conically inclined outer surfaces 56 and 58. The side edges 60 and 62 of sealing ring 52 preferably comprise narrow flat surfaces. The intersections of these narrow flat side edges 60 and 62 with the respective outer surfaces 56 and 58 result in outer corners 64. Similarly, the intersections of these flat side edges 60 and 62 with the cylindrical inner surface 54 result in inner corners 66.

Referring now particularly to FIGURE 2 of the drawings, it will be seen that my sealing ring 52 is somewhat wider than the combined depths of the two opposed grooves 38 and 40, so that the side edges 60 and 62 of the ring 52 will abut against the groove surfaces adjacent to the curved bottom portions 46 of the grooves before the flat annular surfaces 32 and 34 of the two sections of the joint have been drawn completely together.

Although the width of ring 52 relative to the combined depths of the grooves 38 and 40 is not in any way critical, in one example where I provided an aluminum ring having an internal diameter of 1.030 inches, the ring width was .250 inch, while the combined depths of the grooves was .230 inch. In this same example, the radius of curvature for the curved bottom portions 46 of the grooves was a maximum of .020 inch, and the narrow, flat surfaces of the ring side edges 60 and 62 were about .050 inch wide.

After disposing the ring 52 in the position illustrated in FIGURE 2, the bolts 36 are then tightened until the flat annular surfaces 32 and 34 are brought tightly together.

During the tightening of bolts 36, the corners 64 and 66 of ring 52 are mashed against the surfaces of the grooves 38 and 40, the corners 64 and 66 flowing or molding to the contours of the grooves 38 and 40 in a permanent set until the side edges of ring 52 curve generally to the shapes of the bottoms of the grooves 38 and 40, to provide an excellent seal within each of the grooves 38 and 40.

It will be noted from FIGURE 3 of the drawings which illustrates the final sealed position of the joint 10 that sufficient compressive forces are applied axially to the ring 52 while mashing the slide edge corners 64 and 66 in the grooves 38 and 40 to cause the entire ring 52 to bow. In FIGURE 3 of the drawings the ring 52 has bowed outwardly during the compression. However, the direction in which the ring will bow, either outwardly as in FIGURE 3, or inwardly as illustrated in FIGURE 4, will be determined according to whether the outer corners 64 or the inner corners 66 are the first to engage the groove surfaces as the two sections of the joint are drawn together. For example, if the ring is slightly on the large side, the outer corners 64 will first engage in the grooves, tending to bend the outer side edges 60 and 62 inwardly, and hence tending to bow the ring in the manner shown in FIGURE 3. Alternatively, in the event the ring 52 tends to be on the small side, the inner corners 66 will first engage the grooves, tending to bend the side edges 60 and 62 outwardly, to cause an inward bowing such as that shown in FIGURE 4.

I have found in practice that my present invention will operate just as satisfactorily regardless of whether the ring 52 bows outwardly or inwardly.

It will be noted from the drawings that when my sealing ring 52 is in its operative sealing position as shown in FIGURES 3 and 4, there is a substantial angle between the inner ring surface 54 and the inner groove surfaces 44. Likewise, there is a substantial angle between the outer ring surfaces 56 and 58 and the outer groove surfaces 42. These substantial angles permit the outer and inner corners 64 and 66 to present relatively sharp edges to the groove surfaces, whereby the mashing of these edges is rendered possible without requiring unduly large compressive forces. Accordingly, an excellent high pressure seal is set up in my present invention without requiring the usual heavy flange construction normally associated with high pressure seals.

In operation, fluid under pressure is freely admitted from the flow passages 20 and 22 through the annular opening 51 so that fluid pressure is applied to the inner surface 54 of sealing ring 52. This will provide a substantial outward force against the ring 52, giving a self-actuating type of seal against the outer groove surfaces 42 which tends to improve as the fluid pressure increases.

It will be noted that my sealing ring 52 is disposed quite close to the passages 20 and 22, whereby the sealing ring 52 has the smallest possible diameter. This results in the lowest possible forces applied by the ring 52 against the annular body portions 16 and 18, whereby the body portions 16 and 18 may be kept quite small in comparison with conventional high pressure joints.

By providing my ring with a delta shaped cross-section, I provide excellent beam strength of the ring, while at the same time permitting the side edges of the ring to be mashed into sealing engagement with the bottoms of the grooves. By orienting my delta shaped ring so that the generally axially directed cylindrical surface comprises the inner surface 54, I permit the ring 52 to be as closely spaced as possible to the passages 20 and 22 through the body portions 16 and 18, to further minimize the forces on the body portions 16 and 18.

By mashing an annular corner edge of a malleable metal ring into sealing engagement in the groove instead of attempting to force a sealing engagement between a pre-shaped ring and a complementarily shaped groove, I have been able to greatly reduce both the size and weight of the joint. For example, for comparable pressures and conduit sizes, I have been able to reduce the over-all weight of my sealed joint to as little as one-fifteenth of the weight of a conventional prior art high pressure sealed joint.

Similarly, I have been able to achieve material cost savings on the order of nine hundred percent over the conventional high pressure joints.

A further advantage of my present invention is that the mashing of the corner edges of the ring into sealing engagement in the grooves provides a perfet seal regardless of minor variations in the sizes and shapes of the parts. Accordingly, manufacturing tolerances are not as critical in my present invention as in conventional high pressure joints.

It will be apparent that no permanent damage occurs to the surfaces of the annular grooves 38 and 40 as a result of the sealing engagement of ring 52 therein, the ring 52 being composed of substantially softer material than the annular body portions 16 and 18. Accordingly, if at any time it is desired for any reason to replace the sealing ring with a new ring, all that is required is to disengage the bolts 36, removing the old ring and replacing it with a new ring, and then compressing the body portions 16 and 18 back together in the aforesaid manner. The old ring, of course, will have a permanent bow therein, and its side edges will be permanently mashed.

It is to be understood that the form of my invention herein shown and described is my preferred embodiment, and that various changes in the shape, size and arrangement of parts may be resorted to without departing from the spirit of my invention or the scope of my appended claims.

I claim:

1. A joint including a pair of members to be sealed together against the escape of fluid under pressure, means operatively connected to said members to draw and hold said members together, opposed annular grooves in said members, the walls of each groove comprising inner and outer walls converging at an incline relative to the axis of the groove to a curved, concave groove bottom, said grooves being complementary in shape, and the outer wall of each groove being disposed at a substantially larger angle to the axis of the groove than the inner wall, a sealing ring composed of malleable metal positioned in said grooves, said ring being narrower radially than said grooves at its central region and having narrow, flat side edges, the central region of the ring being thicker than the side edges, the corners of each of said ring side edges engaging against the sides of the respective groove near the bottom thereof, said ring having a generally delta-shaped cross-section with the flat side of the delta facing the inner groove walls and the inclined sides of the delta facing the outer groove walls, the ring being substantially wider axially than the combined depths of said grooves, whereby said ring corners will be formed to the shape of the grooves when said ring is compressed into said grooves by drawing said members together.

2. A joint including a pair of members to be sealed together against the escape of fluid under pressure, means operatively connected to said members to draw and hold said members together, opposed annular grooves in said members, the walls of each groove comprising inner and outer walls converging at an incline relative to the axis of the groove to a curved, concave groove bottom, said grooves being complementary in shape, with one wall of each groove being disposed at a substantially larger angle to the axis of the groove than the other wall, a sealing ring composed of malleable metal positioned in said grooves, said ring being narrower radially than said grooves at its central region and having narrow, flat side edges, the central region of the ring being thicker than the side edges, the corners of each of said ring side edges engaging against the sides of the respective groove near the bottom thereof, said ring having a generally delta-shaped cross-section with the flat side of the delta facing said other wall of both grooves and the inclined sides of the delta facing said one wall of both grooves, the ring being substantially wider axially than the combined depths of said grooves, whereby said ring corners will be formed to the shape of the grooves when said ring is compressed into said grooves by drawing said members together.

References Cited in the file of this patent

UNITED STATES PATENTS

| | | |
|---|---|---|
| 392,931 | Prindle | Nov. 13, 1888 |
| 508,765 | Rouse | Nov. 14, 1893 |
| 1,013,302 | Messer | Jan. 2, 1912 |
| 2,479,612 | Glidden | Aug. 23, 1949 |
| 2,863,679 | Dunbar | Dec. 9, 1958 |

FOREIGN PATENTS

| | | |
|---|---|---|
| 303,408 | Great Britain | Dec. 28, 1928 |